United States Patent Office 3,458,584
Patented July 29, 1969

---

3,458,584
2-BROMO-2-CHLORO-1,1,3,3-TETRAFLUORO-PROPANE
Bernard M. Regan, Chicago, Ill., assignor to Baxter Laboratories, Inc., Morton Grove, Ill., a corporation of Delaware
No Drawing. Continuation-in-part of application Ser. No. 538,523, Feb. 2, 1966. This application Aug. 31, 1967, Ser. No. 664,605
Int. Cl. C07c *19/08, 17/04, 21/18*
U.S. Cl. 260—653  7 Claims

ABSTRACT OF THE DISCLOSURE 2-bromo-2-chloro-1,1,3,3-tetrafluoropropane, useful as a nonflammable inhalation anesthetic which is stable toward soda-lime.

---

This is a continuation-in-part of co-pending application Ser. No. 538,523, filed Feb. 2, 1966, now U.S. Patent 3,362,874.

This invention relates to a novel polyhalotetrafluoropropane. More particularly, this invention relates to a bromochlorotetrafluoropropane having both a bromine atom and a chlorine atom substituted on the number two carbon atom, namely, 2-bromo-2-chloro-1,1,3,3-tetrafluoropropane.

It is known that certain halogenated alkanes are useful inhalation anesthetics. Chloroform and halothane are well-known examples of such compounds which are derivatives of the lower alkanes, methane and ethane, respectively. More recently, it has also been found that certain halogenated propanes are useful inhalation anesthetics. Thus, Muray et al., U.S. Patent 3,177,260, disclose the inhalation anesthetic use of 3-bromo-3-chloro-1,1,2,2-tetrafluoropropane, which is a position isomer of the bromochlorotetrafluoropropane of the present invention.

Another position isomer of the compound of this invention also is known. Thus, Tarrant et al., 77 J. Am. Chem. Soc'y., 768 (1955) discloses 1-bromo-3-chloro-1,1,3,3-tetrafluoropropane. However, the latter compound is not known as an anesthetic.

It has now been found that the novel 2-bromo-2-chloro-1,1,3,3-tetrafluoropropane of this invention is a useful nonflammable inhalation anesthetic in mice, which is more potent and has a greater inhalation margin of safety than ether, chloroform and halothane, which are in current use as inhalation anesthetics. Moreover, the novel compound of this invention is stable toward soda-lime as distinguished from the isomeric 3-bromo-3-chloro-1,1,2,2-tetrafluoropropane of Muray et al. and the isomeric 1-bromo-3-chloro-1,1,3,3-tetrafluoropropane of Tarrant et al., which are not stable toward soda-lime. As such, the novel bromochlorotetrafluoropropane of this invention holds good promise as an effective and useful agent for inducing anesthesia in man, including use in conventional recirculation apparatus which employs soda lime for the absorption of carbon dioxide from the patient undergoing anesthesia.

The novel 2-bromo-2-chloro-1,1,3,3-tetrafluoropropane of the present invention is a clear liquid at normal room temperature and has a boiling point of 94° C. at 760 mm. Hg. It can be conveniently stored in containers normally used for conventional anesthetics of comparable boiling points, e.g., halothane. It is nonexplosive and nonflammable in oxygen and in air at ambient temperatures. This compound can be administered by apparatus or machines designed for the vaporization of liquid anesthetics or mixtures thereof with oxygen, air or other gaseous mixtures containing oxygen in amounts capable of supporting respiration.

For use in anesthesia, the 2-bromo-2-chloro-1,1,3,3-tetrafluoropropane should be free from toxic impurities which may be present according to the particular process used for its manufacture. This compound can, however, be used in admixture with pharmaceutically acceptable diluents and stabilizers, e.g., thymol, or one or more of the known inhalation anesthetics, e.g., nitrous oxide, ether, halothane, chloroform, cyclopropane, methoxylfluorane, and the like.

The novel bromochlorotetrafluoropropane defined here-is prepared from the novel monohalotetrafluoropropanes disclosed and claimed in co-pending application Ser. No. 538,523, filed Feb. 2, 1966, namely, 2-chloro-1,1,3,3-tetrafluoropropane and 2-bromo-1,1,3,3 - tetrafluoropropane. This preparation can be caried out in two distinct ways:

(1) by direct substitution of hydrogen by chlorine on the number two carbon position in 2-bromo-1,1,3,3-tetrafluoropropane or
(2) by elimination of this hydrogen and a fluorine from 2-chloro-1,1,3,3-tetrafluoropropane to form the intermediate cis- and trans-2-chloro-1,3,3-trifluoropropenes, followed by addition of the elements BrF in proper orientation.

These two methods of preparation can be represented by the following reaction equations:

(1) $CHF_2-CHBr-CHF_2 + Cl_2 \longrightarrow CHF_2-CBrCl-CHF_2$

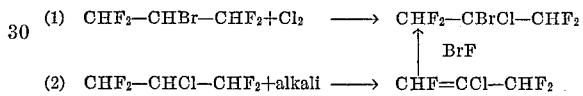

(2) $CHF_2-CHCl-CHF_2 + \text{alkali} \longrightarrow CHF=CCl-CHF_2$

In reaction (1), above, photochlorination of 2-bromo-1,1,3,3-tetrafluoropropane, preferably with from about 0.5 to about 1.0 molar equivalent of chlorine, produces 2-bromo-2-chloro-1,1,3,3 - tetrafluoropropane, b.$_{760}$ 94° C., which is distinguishable from the other theoretically possible monochlorination product, 2-bromo-1-chloro-1,1,3,3-tetrafluoropropane, by proton nuclear magnetic resonance spectroscopy.

In reaction (2), above, the action of soda lime or other alkaline reagents on 2-chloro-1,1,3,3-tetrafluoropropane, preferably at a temperature of from about 25° C. to about 65° C. produces almost exclusively cis- and trans-2-chloro-1,3,3-trifluoropropenes in a proportion of about 12:1. Addition of the elements BrF to this propene mixture or to either isomer by the action of a mixture of about a one-third molar equivalent of bromine trifluoride and about a one-third molar equivalent of bromine, preferably at a temperature of from about −30° C. to about 25° C. and in a suitable diluent, for example, 1,1,2-trichloro-1,2,2-trifluoroethane, produces 2-bromo-2-chloro-1,1,3,3-tetrafluoropropane, b.$_{760}$ 94° C., in preference to the other theoretically possible bromine trifluoride adduct, 1-bromo-2-chloro-1,2,3,3-tetrafluoropropane, as shown by proton nuclear magnetic resonance spectral analysis. In this method of preparation of the novel bromochlorotetrafluoropropane of the present invention, about one molar equivalent of bromine trifluoride can be substituted for the bromine trifluoride-bromine mixture with substantially equivalent results.

The intermediate cis- and trans-2-chloro-1,3,3-trifluoropropenes which are used to prepare the novel inhalation anesthetic defined herein also are novel compounds. They can be conveniently prepared as described above by reaction of 2-chloro-1,1,3,3-tetrafluoropropane and soda-lime or other alkaline reagents, for example, potassium hydroxide, sodium carbonate, pyridine and the like.

Although the above methods of preparation and reaction and reaction conditions are specifically described, it will be understood that the novel compounds of this invention are not limited to these specific reaction conditions or to these specific methods of preparation. For example, it will be apparent that the novel bromochlorotrifluoropropane of this invention can be prepared by bromination of 2-chloro-1,1,3,3-tetrafluoropropane in a manner analogous to the chlorination of 2-bromo-1,1,3,3-tetrafluoropropane and by the reaction of ClF or ClF$_3$ with 2-bromo-1,3,3-trifluoropropenes in a manner analogous to the BrF addition to 2-chloro-1,3,3-trifluoropropenes.

The 2-bromo-1,3,3-trifluoropropenes also are novel compounds and can be conveniently prepared in a manner analogous to the preparation of the 2-chloro-1,3,3-trifluoropropenes by reaction of 2-bromo-1,1,3,3-tetrafluoropropane and soda lime or other alkaline reagents, preferably at a temperature of from about 25° C. to about 85° C.

The preparation of the 2-bromo- and 2-chloro-1,1,3,3-tetrafluoropropanes by the reaction of an alkali metal chloride and the p-toluenesulfonate ester of 1,1,3,3-tetrafluoropropan-2-ol is disclosed in co-pending application Serial No. 538,523, filed February 2, 1966.

The following examples will further illustrate the present invention, although the invention is not limited to these specific examples. All percentages and parts herein are on a weight basis unless otherwise specified.

EXAMPLE 1

1,1,3,3-tetrafluoropropan-2-ol (I).—Hydrogen at the rate of one-half liter per minute was bubbled through 1,3-dichloro-1,1,3,3-tetrafluoroacetone at −4° C. The mixture of vapors passed through a Pyrex tube (45 cm. x 1.9 cm., I.D.) containing 2% palladium on carbon granules (4–12 mesh) and heated to 200° C. The reaction products were condensed in a trap cooled by Dry Ice. A 750:1 ratio by weight of dichloro-tetrafluoroacetone to palladium is optimum.

In a typical run 1250 grams (6.28 moles) of dichlorotetrafluoroacetone was vaporized with hydrogen during 22 hours and the mixture passed over 85 grams of palladium-carbon catalyst. Fractional distillation of the reaction products gave 704 grams (5.33 moles, 85% of theory) of crude alcohol (I) B.P. 106–109° C., suitable for use in the next step.

Alternatively, the alcohol (I) can be prepared by reduction of 1,1,3,3-tetrafluoroacetone with sodium borohydride. The alcohol (I) obtained in this manner had B.P. 107–09° C., $n_D^{19}$ 1.333. The identity of the alcohols prepared in these two ways was confirmed by infrared spectra.

EXAMPLE 2

1,1,3,3-tetrafluoro-2-propyl p-toluenesulfonate (II).—A mixture of crude 1,1,3,3-tetrafluoropropan-2-ol (I) (315 gm., 2.4 moles), p-toluenesulfonyl chloride (460 gm., 2.4 moles) and 600 ml. of water was stirred as 5 N sodium hydroxide (514 ml., 2.57 moles) was added during 1.5 hours, and the temperature was maintained between 25° C.–40° C. Stirring was continued for 16 hours. The lower layer of crude ester (II) was separated, stirred, evacuated to between 25–40 mm. Hg and heated to 125° C. until volatile impurities ceased to be removed. Five hundred eighty-three gm. (2.04 moles, 85% of theory) of crude ester (II) suitable for use in subsequent steps was obtained. Crystallization from ligroin gave II, M.P. 31° C., $n_D^{35}$ 1.466.

Analysis.—Calculated for $C_{10}H_{10}F_4O_3S$, percent: C, 41.91; H, 3.52, S, 11.20. Found, percent: C, 42.13; H, 3.63; S, 10.95.

EXAMPLE 3

2-bromo-1,1,3,3-tetrafluoropropane (III).—To a stirred mixture of potassium bromide (357 gm., 3.0 moles) in 700 ml. of diethylene glycol heated to between 200°–210° C., crude 1,1,3,3-tetrafluoro-2-propyl p-toluenesulfonate (II) (572 gm., 2.0 moles) was added during 1.5 hours. The vapors of III rose through a Vigreux distilling column and descended through a cold-water spiral condenser. The liquid product was collected in an ice-cooled receiver for 1.5 hours after the addition of II was completed. It was chiefly a mixture of III, 1,4-dioxane and water, from which the III was purified by successive washings with water and aqueous 60% sulfuric acid. It was neutralized by a wash with cold dilute aqueous sodium hydroxide. The crude bromide III amounted to 314 gm. (81.5% of theory). Fractional distillation gave 256 gm. of III, b.$_{744}$ 82.6–82.8° C. Pure (99.9% by G.L.C.) III has b.$_{760}$ 83° C., $d_4^{20}$ 1.8743, $n_D^{20}$ 1.3691 and a vapor pressure of 57 mm. Hg at 20° C. Its vapor pressure-temperature equation is $$\log P = 8.1590 - \frac{1878.4}{T}$$

Its 60 mc. nuclear magnetic resonance (NMR) and infrared spectra confirmed the CHF$_2$—CHBr—CHF$_2$ structure.

EXAMPLE 4

2-chloro-1,1,3,3-tetrafluoropropane (IV).—In the same manner as for the bromide III, potassium chloride (81 gm., 1.07 mole), 350 ml. of diethylene glycol and crude tosyl ester II (202.7 gm., 0.71 mole) were caused to react and the crude chloride IV (93 gm., 86% theory) was isolated after successive water washings. Fractional distillation gave 65 gm. of IV, b.$_{744}$ 64.4–64.7° C. Pure (99.9% by G.L.C.) IV has b.$_{760}$ 65° C., $d_4^{20}$ 1.4914, $n_D^{20}$ 1.3345 and a vapor pressure of 122 mm. Hg at 20° temperature equation is $$\log P = 8.0475 - \frac{1747.3}{T}$$

Its 60 mc. NMR and infrared spectra confirm the CHF$_2$—CHCl—CHF$_2$ structure.

EXAMPLE 5

Cis- and trans-2-chloro-1,3,3-trifluoropropenes (V).—A mixture of 2-chloro-1,1,3,3-tetrafluoropropane (IV) (376 gm., 2.50 moles) and low-moisture (about 2% water) soda lime (250 gm.) was heated to boiling under total reflux for eighteen hours. Gas-liquid chromatographic, infra-red, and proton nuclear magnetic resonance analyses of the liquid reaction product showed essentially complete conversion to a mixture of cis- and trans-2-chloro-1,3,3-trifluoropropenes. The ratio of the cis- and trans-propene isomers produced was about 12:1. The predominant propene has a longer retention time than either the other propene or the starting propane on a column packed with 20% diisodecylphthalate on "Chromasorb P" at 80° C. to 100° C. Fractional distillation of the propene mixture afforded an efficient separation of the cis- and trans-isomers, with the minor isomer concentrating in the forerun. The predominant propene has b.$_{745}$ 57.7–57.8° C. $d_4^{20}$ 1.4138, $n_D^{20}$ 1.3588. Altogether 284 grams (92% yield) of cis- and trans-2-chloro-1,3,3-trifluoropropenes was collected, b.$_{745}$ 51.3–57.9° C., of which 227 grams had b.$_{745}$ 57.5–57.9° C. and is 99.9% the predominant propene isomer.

EXAMPLE 6

Cis- and trans - 2-bromo - 1,3,3-trifluoropropenes (VI).—In the same manner as for chloride V, a mixture of 2-bromo - 1,1,3,3-tetrafluoropropane (III) (368 gm., 1.88 moles) and low-moisture (about 2% water) soda lime (180 gm.) were caused to react for about sixteen hours to produce a mixture of cis- and trans-2-bromo-1,3,3-trifluoropropenes. The ratio of the cis- and trans-propene isomers produced was about 13:1. The predominant propene has a longer retention time than either the other propene or the starting propane on a column packed with 20% diisodecylphthalate on "Chromasorb P" at 80° C. to 100° C. Fractional distillation of the propene mixture did not afford an efficient separation, and the cis- and trans-isomers distilled concurrently, b.$_{743-5}$ 77.5–78.0° C., (290 gm., 1.66 moles, 88% yield). The last fraction collected afforded the purest product, b.$_{745}$ 78.0° C., $d_4^{20}$ 1.8429, $n_D^{20}$ 1.3961, and is 99.4% the predominant propene and 0.54% the other propene.

EXAMPLE 7

2-bromo-2-chloro-1,1,3,3-tetrafluoropropane (VII).—2-chloro-1,3,3-trifluoropropenes (V) (46.5 g., 0.355 mole) were added to a mixture of bromine trifluoride (5.9 ml., 0.12 mole), bromine (6.2 ml., 0.12 mole), and 100 ml. of 1,1,2-trichloro-1,2,2-trifluoroethane diluent at −70° C. in a Teflon bottle. The mixture was allowed to warm gradually. At about −30° C. stirring of the mixture was begun with a Teflon-coated magnetic bar. An exothermic reaction subsequently ensued and the reaction mixture boiled for a short time. When the reaction subsided, the mixture was stirred for 30 minutes and then poured into a mixture of ice and water. The lower layer was separated and washed with an aqueous solution of sodium hydroxide and sodium sulfite to neutralize and decolorize the product in this layer. The lower layer was separated again, dried over anhydrous calcium chloride, and distilled to remove the diluent. The remainder (69 gm.) was fractionally distilled (from 100 mg. of thymol) to yield a forerun, 9.5 gm., boiling 50° to 93° C.; the novel compound of this invention, 2-bromo-2-chloro-1,1,3,3-tetrafluoropropane (VII), 35.4 gm., boiling 93° to 93.6°; and a 25 gm. residue. Gas-liquid chromatography showed the 35.4 gram fraction to be 98° a single component which was shown to have the CHF$_2$—CBrCl—CHF$_2$ structure by proton nuclear magnetic resonance spectra. Refractionation gave 2-bromo-2-chloro-1,1,3,3-tetrafluoropropane of 99.7% purity (by G.L.C.), B.P.$_{760}$ 94° C., $d_4^{25}$ 1.902.

EXAMPLE 8

2-bromo-2-chloro-1,1,3,3-tetrafluoropropane (VII).—A solution of 2-chloro-1,3,3-trifluoropropenes (V) in 1,1,2-trichloro-1,2,2-trifluoroethane (3 ml./gm. of propenes) is cooled to −20° C. and stirred in a Teflon bottle joined to a trap cooled to −70° C. Bromine trifluoride is added in increments through a Teflon syringe to this solution maintained at −20° C. until one molar equivalent (0.42 ml./gm. of propene) has been added. The reaction mixture is stirred and allowed to warm during a period of from one to three hours to 10° C., during which time an exothermic reaction occurs. After the reaction subsides, stirring is continued for a short time and then the mixture is poured onto crushed ice. The organic layer is separated and then decolorized and deacidified by washing with cold aqueous sodium hydroxide solution. The washed product is separated and fractionally distilled to obtain 2-bromo-2-chloro-1,1,3,3-tetrafluoropropane (VII), b.$_{760}$ 94° C., in about 40% yield.

EXAMPLE 9

2-bromo-2-chloro-1,1,3,3-tetrafluoropropane (VII).—In the same manner as for the chloride in Example 8, a solution of 2-bromo-1,3,3-trifluoropropenes (VI) in 1,1,2-trichloro-1,2,2-trifluoroethane (3 ml./gm. of propenes) is cooled to −20° C. and stirred in a Teflon bottle joined to a trap cooled to −70° C. Chlorine trifluoride is slowly bubbled into this solution until one molar equivalent (0.53 gm./gm. of propene) has been added. The reaction mixture is stirred and allowed to warm to 10° C. during a period of three hours and then poured onto crushed ice. The organic layer is separated and then decolorized and deacidified by washing with cold aqueous sodium sulfite and sodium hydroxide solutions. The washed product is separated, dried, and fractionally distilled to obtain 2-bromo-2-chloro-1,1,3,3-tetrafluoropropane (VII), b.$_{760}$ 94° C.

EXAMPLE 10

2-bromo-2-chloro-1,1,3,3-tetrafluoropropane (VII).—Chlorine gas (120 gm., 1.7 moles) was bubbled at a rate of 15 grams per hour into 2-bromo-1,1,3,3-tetrafluoropropane (III) (370 gm., 1.9 moles) illuminated by a sun lamp through a Pyrex flask. The reaction mixture was allowed to come to a boil and reflux through a cold water condensor surmounted by a Dry Ice condensor followed by a Dry Ice cooled trap. The chlorination product was cooled, deacidified by washing with water and cold dilute aqueous sodium hydroxide solution and dried to yield a product weighing 419 grams. Gas-liquid chromatographic separation of this product on a column ten feet long and ¼ inch in diameter packed with 20% diisodecylphthalate on firebrick at 105° C. showed four components totaling 99.3% of the product. 2-bromo-2-chloro-1,1,3,3-tetrafluoropropane (VII) was identified as one of these components by its proton nuclear magnetic resonance spectrum. Its isolation by preparative gas-liquid chromatography is indicated.

EXAMPLE 11

Inhalation of the vapor of 2-bromo-2-chloro-1,1,3,3-tetrafluoropropane admixed with air in the manner described by Robbins, 86 J. Pharmacol. Exper. Therap., 197–204 (1946), produced anesthesia in white mice. The minimum concentration by volume percent required to produce full anesthesia (loss of negative righting reflex) in 50% of the test animals in five minutes, AC$_{50}$, and the minimum concentration by volume percent required to kill 50% of the test mice in five minutes, LC$_{50}$, are given in Table I, below. The inhalation margin of safety as measured in mice by the ratio LC$_{50}$/AC$_{50}$ is also given in Table I. For purposes of comparison, similar data which were obtained under the same conditions as for the above compound are given for three inhalation anesthetics in current use, namely, ether, chloroform, and halothane. The number of mice used with the different anesthetic agents varied from 25 to 92 for determining each of the AC$_{50}$ and LC$_{50}$ doses.

TABLE I.—INHALATION ANESTHESIA IN MICE

| Compound | AC$_{50}$ | LC$_{50}$ | LC$_{50}$/AC$_{50}$ |
|---|---|---|---|
| CHF$_2$—CBrCl—CHF$_2$ | 0.42 | 1.89 | 4.5 |
| Ether | 3.69 | 12.0 | 3.2 |
| Chloroform | 0.94 | 2.56 | 2.7 |
| Halothane | 0.78 | 2.62 | 3.4 |

The results set forth in the above table show that the novel bromochlorotetrafluoropropane of this invention is more potent and has a greater inhalation margin of safety than the three inhalation anesthetics in current use.

EXAMPLE 12

The soda lime stability of the novel inhalation anesthetic of the present invention was determined essentially according to the procedure of Glover and Hodgson, 16 Anesthesia 19–23 (1961). The liquid anesthetic (0.65 ml.) and soda lime (0.50 gm., 8–12 mesh, 15%–20% by weight of water) were sealed in a glass ampule and heated at 70° C. for three hours and then analyzed by gas-liquid partition chromatography. For purposes of comparison, a liquid anesthetic blank was treated in the same way in the absence of soda lime. The chromatographic results are given in Table II, below, in which "R.T." is retention time in minutes from air and "Area Percent" is 100 times the ratio of the area under a peak to the total area under all peaks in the recorded chromatogram. A column ten feet long and ¼ inch in diameter packed with 20% diisodecylphthalate on 80–100 mesh firebrick and a thermoconductivity detector were employed in this study. For purposes of comparison, similar data which were obtained under the same conditions as for the above compound is given for halothane and for 3-bromo-3-chloro-1,1,2,2-tetrafluoropropane, which is a position isomer of the novel anesthetic compound of this invention and disclosed as having inhalation anesthetic properties.

TABLE II.—SODA LIME STABILITY OF ANESTHETICS

| Compound | Blank | | Soda lime treated | | | | | |
|---|---|---|---|---|---|---|---|---|
| | R.T. | Area, percent | R.T. | Area, percent | R.T. | Area, percent | R.T. | Area, percent |
| $CHF_2—CBrCl—CHF_2$ | 2.9 | 99.7 | 0.98 | 0.23 | 1.0 | 0.13 | 2.9 | 99.3 |
| $CHF_2—CF_2—CHBrCl$ | 10.4 | 96.7 | 8.5 | 58.5 | 10.4 | 38.3 | | |
| Halothane | 7.2 | 99.9+ | 4.2 | 0.20 | 7.2 | 99.8 | | |

The remarkable soda lime stability of the novel bromochlorotetrafluoropropane of this invention is shown by the high correspondence between the 99.7 and 99.3 area percents after 2.9 minutes of retention time in the blank sample and the soda lime treated sample, respectively.

As will be readily apparent to those skilled in the art, other examples of the herein-defined invention can be devised after reading the foregoing specification and claims appended hereto by various modifications and adaptations without departing from the spirit and scope of the invention. All such modifications and adaptations are included within the scope of the invention as defined in the appended claims.

What is claimed is:
1. 2-bromo-2-chloro-1,1,3,3-tetrafluoropropane.
2. The method of preparing 2-bromo-2-chloro-1,1,3,3-tetrafluoropropane which comprises the addition of the elements BrF to 2-chloro-1,3,3-trifluoropropene by reaction with bromine trifluoride at a temperature of from about −30° C. to about 25° C.
3. 2-chloro-1,3,3-trifluoropropene.
4. The method of preparing 2-chloro-1,3,3-trifluoropropene which comprises the elimination of a hydrogen and a fluorine from 2-chloro-1,1,3,3-tetrafluoropropane by reaction with alkali at a temperature of from about 25° C. to about 65° C.
5. 2-bromo-1,3,3-trifluoropropene.
6. The method of preparing 2-bromo-1,3,3-trifluoropropene which comprises the elimination of a hydrogen and a fluorine from 2-bromo-1,1,3,3-tetrafluoropropane by reaction with alkali at a temperature of from about 25° C. to about 85° C.
7. The method of preparing 2-bromo-2-chloro-1,1,3,3-tetrafluoropropane which comprises the addition of the elements ClF to 2-bromo-1,3,3-trifluoropropene by reaction with chlorine trifluoride at a temperature of from about −30° C. to about 25° C.

References Cited

UNITED STATES PATENTS

| 2,489,970 | 11/1949 | McBee et al. | 260—653 |
| 3,177,260 | 4/1965 | Muray et al. | 260—653 |
| 3,332,840 | 7/1967 | Regan | 260—653 |
| 3,362,874 | 2/1968 | Regan | 167—52.6 |

OTHER REFERENCES

Haszeldine, Chem. Abstracts 46, 7990[h, i] (1952).

DANIEL D. HORWITZ, Primary Examiner

U.S. Cl. X.R.

260—653.3, 653.5; 424—350